(12) United States Patent
Kang et al.

(10) Patent No.: US 12,335,638 B2
(45) Date of Patent: Jun. 17, 2025

(54) ELECTRONIC DEVICE COMPRISING IMAGE SENSOR AND OPERATION METHOD OF SAME

(71) Applicant: Samsung Electronics Co., Ltd., Suwon-si (KR)

(72) Inventors: Kawang Kang, Suwon-si (KR); Dongsoo Kim, Suwon-si (KR); Shuichi Shimokawa, Suwon-si (KR); Yeotak Youn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 18/193,139

(22) Filed: Mar. 30, 2023

(65) Prior Publication Data

US 2023/0254599 A1    Aug. 10, 2023

Related U.S. Application Data

(63) Continuation of application No. PCT/KR2021/013674, filed on Oct. 6, 2021.

(30) Foreign Application Priority Data

Oct. 30, 2020    (KR) .................. 10-2020-0143751

(51) Int. Cl.
*H04N 25/42*    (2023.01)
*H04N 25/46*    (2023.01)
(Continued)

(52) U.S. Cl.
CPC ............. *H04N 25/42* (2023.01); *H04N 25/57* (2023.01); *H04N 25/76* (2023.01); *H04N 25/46* (2023.01)

(58) Field of Classification Search
CPC ........ H04N 25/42; H04N 25/46; H04N 25/57; H04N 25/76
See application file for complete search history.

(56) References Cited

U.S. PATENT DOCUMENTS

| 7,652,691 B2 | 1/2010 | Suwa |
| 7,852,916 B2 | 12/2010 | Duvivier |

(Continued)

FOREIGN PATENT DOCUMENTS

| JP | 4208904 B2 | 1/2009 |
| JP | 2012-120158 A | 6/2012 |

(Continued)

OTHER PUBLICATIONS

International Search Report dated Jan. 20, 2022, issued in International Patent Application No. PCT/KR2021/013674.

*Primary Examiner* — Lin Ye
*Assistant Examiner* — Chriss S Yoder, III
(74) *Attorney, Agent, or Firm* — Jefferson IP Law, LLP

(57) ABSTRACT

An electronic device is provided. The electronic device includes an image sensor and at least one processor connected via at least one interface to the image sensor. The image sensor may obtain first image data corresponding to an N-th frame, and provide, together with the first image data obtained, to the at least one processor via the at least one interface, configuration information of second image data corresponding to an N+k-th frame which is to be provided subsequent to the N-th frame. The N and the k may be natural numbers.

20 Claims, 11 Drawing Sheets

(51) Int. Cl.
*H04N 25/57* (2023.01)
*H04N 25/76* (2023.01)

(56) References Cited

U.S. PATENT DOCUMENTS

| | | | |
|---|---|---|---|
| 8,319,859 | B2 | 11/2012 | Kim et al. |
| 8,605,169 | B2 | 12/2013 | Nishide |
| 10,298,782 | B2 | 5/2019 | Kim et al. |
| 2008/0002038 | A1 | 1/2008 | Suwa |
| 2011/0085064 | A1* | 4/2011 | Nishide ................ H04N 25/531 348/294 |
| 2012/0081578 | A1 | 4/2012 | Cote et al. |
| 2012/0120289 | A1 | 5/2012 | Sugioka et al. |
| 2014/0104455 | A1 | 4/2014 | Lee |
| 2015/0189108 | A1 | 7/2015 | Mizuguchi |
| 2018/0225941 | A1 | 8/2018 | Kim et al. |
| 2019/0104264 | A1* | 4/2019 | Totsuka ................ H04N 25/50 |
| 2020/0186841 | A1 | 6/2020 | Yoshimochi et al. |
| 2020/0267295 | A1 | 8/2020 | Lee et al. |
| 2020/0322559 | A1 | 10/2020 | Shim et al. |
| 2020/0382728 | A1 | 12/2020 | Diasparra et al. |

FOREIGN PATENT DOCUMENTS

| | | |
|---|---|---|
| JP | 2014-138401 A | 7/2014 |
| JP | 6344279 B2 | 6/2018 |
| JP | 2019-68318 A | 4/2019 |
| JP | 2019-204047 A | 11/2019 |
| KR | 10-2011-0019725 A | 2/2011 |
| KR | 10-2014-0048407 A | 4/2014 |
| KR | 10-2019-0025373 A | 3/2019 |
| KR | 10-2020-0096949 A | 8/2020 |
| KR | 10-2020-0117729 A | 10/2020 |
| WO | 2009/154073 A1 | 12/2009 |

* cited by examiner

ELECTRONIC DEVICE COMPRISING IMAGE SENSOR AND OPERATION METHOD OF SAME

CROSS-REFERENCE TO RELATED APPLICATION(S)

This application is a continuation application, claiming priority under § 365(c), of an International application No. PCT/KR2021/013674, filed on Oct. 6, 2021, which is based on and claims the benefit of a Korean patent application number 10-2020-0143751, filed on Oct. 30, 2020, in the Korean Intellectual Property Office, the disclosure of each of which is incorporated by reference herein in its entirety.

BACKGROUND

1. Field

The disclosure relates to a technology related to data output to a processor by an image sensor.

2. Description of Related Art

An image sensor converts light input from the outside into an electric signal to obtain image data. In addition, the image sensor provides the obtained image data and configuration information for the image data to a processor.

The processor may analyze the image data obtained from the image sensor and provide a control signal for changing an output mode to the image sensor when determining that an output mode is required to be changed. Through configuration information for the image data of a corresponding frame obtained from the image sensor, the processor may identify an output mode of the corresponding frame.

The above information is presented as background information only to assist with an understanding of the disclosure. No determination has been made, and no assertion is made, as to whether any of the above might be applicable as prior art with regard to the disclosure.

SUMMARY

In the conventional art, even if an image sensor changes an output mode according to a control signal transmitted by a processor to the image sensor, the processor may have a difficulty accurately identifying a frame of which the output mode has been changed. As such, there is a problem in that frames in which a processing mode of the processor is changed and an output mode of the image sensor is changed do not match. In an example, the output mode for outputting image data by the image sensor and a processing mode prepared by the processor do not correspond to each other and thus a frame drop in which the processor deletes image data of a corresponding frame may occur.

Furthermore, in the conventional art, even if the processor identifies a changed output mode in the corresponding frame through configuration information for image data of the corresponding frame output by the image sensor, the processor may require time for changing the processing mode and thus have a difficulty properly processing an image corresponding to the output mode of the corresponding frame.

In addition, along with the development of technologies, as an amount of image data has increased and the transmission speed has been raised, processing image data based on the configuration information of the corresponding frame may become difficult, and complexity of a camera module structure may cause increase in problems of delaying of a control signal provided by the processor to the image sensor.

Aspects of the disclosure are to address at least the above-mentioned problems and/or disadvantages and to provide at least the advantages described below. Accordingly, an aspect of the disclosure is to provide an electronic device comprising an image sensor and an operation method of the same.

Additional aspects will be set forth in part in the description which follows and, in part, will be apparent from the description, or may be learned by practice of the presented embodiments.

In accordance with an aspect of the disclosure, an electronic device is provided. The electronic device includes an image sensor and at least one processor connected to the image sensor through at least one interface. The image sensor may obtain first image data corresponding to an N-th frame, and provide, together with the first image data obtained, to the at least one processor through the at least one interface, configuration information for second image data corresponding to an N+k-th frame which is to be provided subsequent to the N-th frame. N and the k may be natural numbers.

In accordance with another aspect of the disclosure, an operation method of an electronic device is provided. The operation method includes an operation of obtaining first image data corresponding to an N-th frame by an image sensor included in the electronic device, and an operation of providing, together with the first image data obtained, by the image sensor to the at least one processor included in the electronic device through the at least one interface, configuration information for second image data corresponding to an N+k-th frame which is to be provided subsequent to the N-th frame.

In accordance with an aspect of the disclosure, an electronic device is provided. The electronic device includes an image sensor and at least one processor connected to the image sensor through at least one interface. The at least one processor may provide a control signal for changing an output mode of the image sensor to the image sensor, obtain, from the image sensor through at least one interface, configuration information for first image data corresponding to a N-th frame and second image data corresponding to a N+k-th frame to be provided subsequent to the N-th frame, and prepare processing of the second image data corresponding to the N+K-th frame through the configuration information for the second image data. N and the k may be natural numbers.

According to various embodiments of the disclosure, a frame in which an output mode for providing image data to a processor by an image sensor is changed and a frame in which a processing mode for receiving image data by the processor is changed match, thus preventing a problem caused by frame drops, image data processing delays, or control signal transmission delays.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
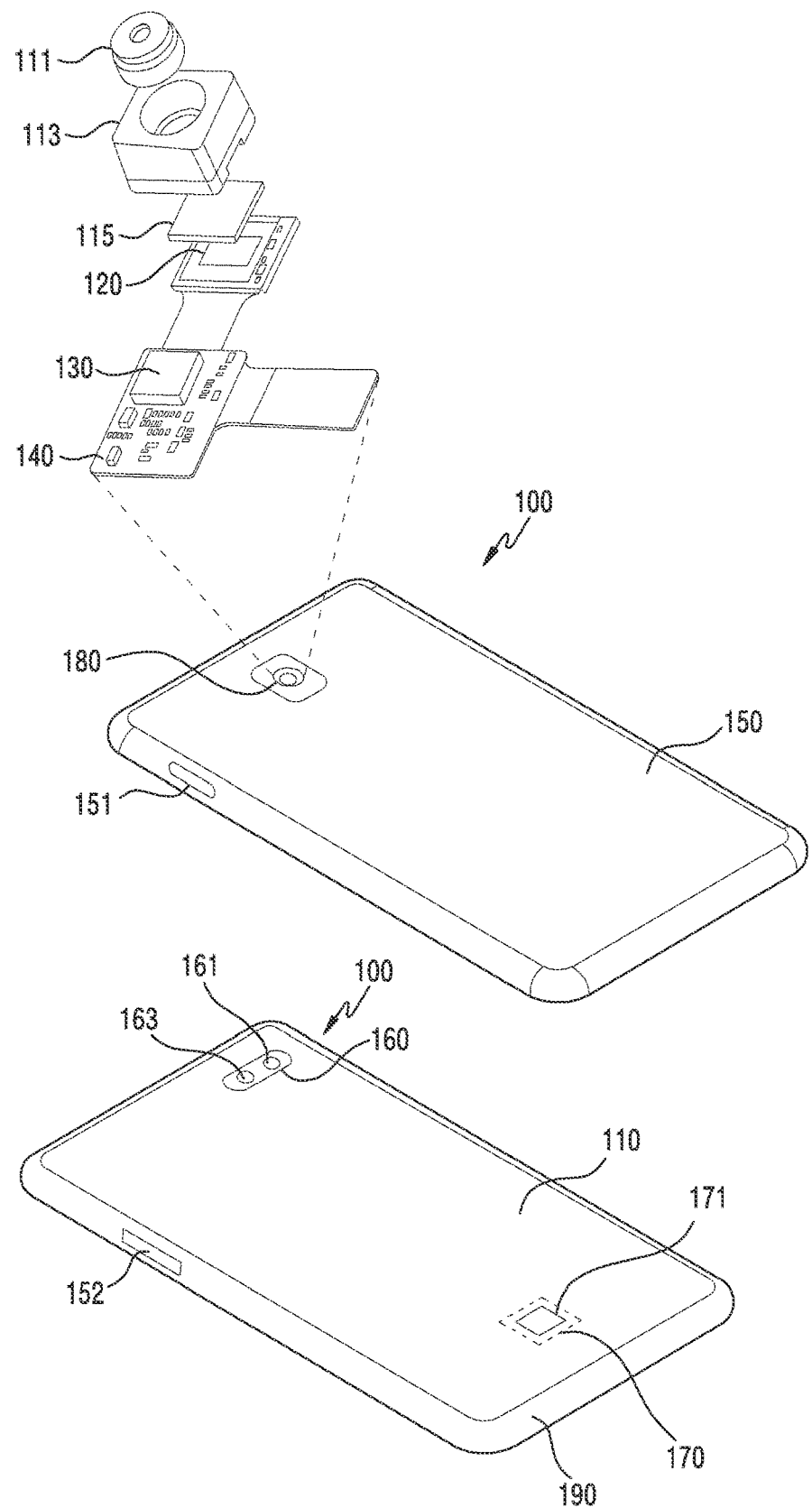
FIG. 1 illustrates a structure of an electronic device and a camera module according to an embodiment of the disclosure.

FIG. 1 illustrates a structure of an electronic device 100 and a camera module 180 according to an embodiment of the disclosure.

FIG. 1 is a diagram schematically illustrating an exterior of an electronic device 100 including a camera module 180 mounted thereto and the camera module 180 according to an embodiment. Although, the embodiment of FIG. 1 is illustrated and described on the premise of a mobile device, in particular, a smartphone, it may be obviously understood by a person skilled in the technical field that the embodiment may be applied to an electronic device including a camera mounted thereto among various electronic devices or mobile devices.

Referring to FIG. 1, a display 110 may be disposed on a front surface of the electronic device 100 according to an embodiment. In one embodiment, the display 110 may occupy most of the front surface of the electronic device 100. In another embodiment, the display 110 and a bezel 190 area configured to surround at least a partial edge of the display 110 may be disposed on the front surface of the electronic device 100. The display 110 may include a flat area and a curved area extending from the flat area to a lateral surface of the electronic device 100. The electronic device 100 shown in FIG. 1 is merely one embodiment and various embodiments are possible. In an example, the display 110 of the electronic device 100 may include the flat area without the curved area or may include the curved area on only one side edge rather than both side edges. In yet another embodiment, the curved area may extend to a rear surface of the electronic device so that the electronic device 100 may include an additional flat area.

The electronic device 100 may additionally include a speaker, a receiver, a front camera, a proximity sensor, a home key, and the like. In another embodiment, the electronic device 100 may include a rear cover 150 integrated with a body of the electronic device. In yet another embodiment, the rear cover 150 may be separated from the body of the electronic device 100 and have a form capable of replacing a battery. The rear cover 150 may be referred to as a battery cover or a rear surface cover.

In one embodiment, a fingerprint sensor 171 for recognizing a user fingerprint may be included on a first area 170 of the display 110. In another embodiment, the fingerprint sensor 171 may be disposed on a layer under the display 110 so that the sensor may not be recognized or may be difficult to be recognized by the user. In addition, a sensor rather than the fingerprint sensor 171 for additional user/biometric authentication may be disposed on a partial area of the display 110. In still another embodiment, the sensor for user/biometric authentication may be disposed on one area of the bezel 190. For example, an IR sensor for iris authentication may be exposed through one area of the display 110 or one area of the bezel 190.

In an embodiment of the disclosure, a front camera 161 may be disposed on a second area 160 of the front surface of the electronic device 100. The embodiment in FIG. 1 shows that the front camera 161 is exposed through one area of the display 110, but the front camera 161 may be exposed through the bezel 190 in another embodiment. The electronic device 100 may include one or more front cameras 161. In an example, the electronic device 100 may include two front cameras such as a first front camera and a second front camera. In another embodiment, the first front camera and the second front camera may be cameras of the same type having equivalent specifications (e.g., a pixel) or the first front camera and the second front camera may be implemented as cameras having different specifications. The electronic device 100 may support a function (e.g., three-dimensional (3D) photographing, auto focusing (AF), etc.) related to a dual camera through the two front cameras. The aforementioned description for the front camera may be equally or similarly applied to a rear camera of the electronic device 100.

In still another embodiment, the electronic device 100 may additionally include various hardware such as a flash for assisting with photographing or a sensor 163 disposed therein. For example, the electronic device 100 may include a distance sensor (e.g., a time of flight (TOF) sensor) for detecting a distance between a subject and the electronic device 100. In still another embodiment, the distance sensor may be applied to the front camera and/or the rear camera. The distance sensor may be separately disposed or included to be disposed to the front camera and/or the rear camera.

In one embodiment, a physical key may be disposed on a lateral side of the electronic device 100. In an example, a first function key 151 configured to turn the display 110 ON/OFF or turn the power of the electronic device 100 ON/OFF may be disposed on a right edge with reference to the front surface of the electronic device 100. In another embodiment, a second function key 152 configured to control a volume or screen brightness of the electronic device 100 may be disposed on a left edge with reference to the front surface of the electronic device 100. Additionally, an additional button or key may be disposed on the front surface or the rear surface of the electronic device 100. In another example, a physical button or a touch button mapped to a specific function may be disposed on a lower end area of the bezel 190 on the front surface.

The electronic device 100 shown in FIG. 1 is merely an embodiment and does not limit the type of device to which the technical idea disclosed herein is applied. In an example, by employing a flexible display and a hinge structure, the technical idea of the disclosure may be applied to a foldable electronic device capable of folding in a horizontal direction or vertical direction, a rollable electronic device capable of rolling, a tablet computer, or a laptop computer. In another example, the technical idea of the disclosure may be applied to a case in which a first camera and a second camera facing the same direction may be disposed to face different directions by rotation, folding, transformation, or the like of a device.

Referring to FIG. 1, the electronic device 100 according to an embodiment may include the camera module 180. In an embodiment, the camera module 180 may include a lens assembly 111, a housing 113, an infrared cut filter 115, an image sensor 120, and an image signal processor (ISP) 130.

In another embodiment, the lens assembly 111 may have different numbers, arrangements, kinds, and the like of lenses according to the front camera and the rear camera. In yet another embodiment, the front camera 161 and the rear camera may have different characteristics (e.g., a focal length and a maximum magnification) depending on a type of the lens assembly 111. The lens may move frontward and backward based on an optical axis and may operate to clearly capture a target object to be a subject by changing a focal length.

In one embodiment, the camera module 180 may include a housing 113 including a body tube to which at least one lens aligned on an optical axis is mounted and at least one coil for surrounding a circumference of the body tube based on the optical axis.

In another embodiment, the infrared cut filter 115 may be disposed at the upper surface of the image sensor 120. An image of the subject passing through the lens may be filtered by the infrared cut filter 115 and then may be detected by the image sensor 120.

In still another embodiment, the image sensor 120 may be disposed on the upper surface of a printed circuit board 140. The image sensor 120 may be connected to the image signal processor 130 connected to the printed circuit board 140 by a connector. A flexible printed circuit board (FPCB) or a cable may be used as the connector.

In yet another embodiment, the image sensor 120 may include a complementary metal oxide semiconductor (CMOS) sensor or a charged coupled device (CCD) sensor. Multiple pixels are integrated in the image sensor 120 and each individual pixel may include a micro lens, a color filter, and a photodiode. Each individual pixel corresponds to a kind of photodetector and may convert input light into an electric signal. A photodetector may not detect a wavelength of captured light by itself and may not determine color information. The photodetector may include a photodiode.

Information of light of the subject incident through the lens assembly 111 may be converted into an electric signal by the image sensor 120 and input to the image signal processor 130.

In one embodiment, in case that the image signal processor 130 and the image sensor 120 are physically separated from each other, a sensor interface following a proper standard may electrically connect the image sensor 120 and the image signal processor 130.

In another embodiment, the image signal processor 130 may perform image processing with respect to electrically converted image data. A process performed in the image signal processor 130 may be divided into a pre-ISP (hereinafter, pre-processing) and an ISP chain (hereinafter, post-processing). An image processing prior to a demosaic process may mean a pre-processing and an image processing after the demosaic process may mean a post-processing. In yet another embodiment, the pre-processing process may include 3A processing, lens shading correction, edge enhancement, dead pixel correction, and knee correction. The 3A may include at least one of auto white balance (AWB), auto exposure (AE), and auto focusing (AF). The post-processing process may include at least one of a sensor index value change, tuning parameter change, and screen ratio change. The post-processing process may include a process of processing image data output from the image sensor 120 or image data output from a scaler. In an embodiment, the image signal processor 130 may adjust, through the post-processing process, at least one of contrast, sharpness, saturation, and dithering. Here, contrast, sharpness, and saturation adjustment procedures may be performed in a YUV color space, and a dithering procedure may be performed in an Red Green Blue (RGB) color space. A portion of the pre-processing process may be performed during the post-processing process, and a portion of the post-processing process may be performed during the pre-processing process. A portion of the pre-processing process may overlap a portion of the post-processing process.

In an embodiment of the disclosure, the camera module 180 may be disposed on the front surface of the electronic device 100 as well as on the rear surface of same. In addition, the electronic device 100 may include multiple camera modules 180 in addition to one camera module 180 for camera performance improvement. In another example, the electronic device 100 may further include a front camera 161 for video call or self-camera photographing. The front camera 161 may support a relatively low number of pixels compared to the rear camera module. In another embodiment, the front camera 161 may be relatively small compared to the camera module 180 of the rear camera.

Figure 2:
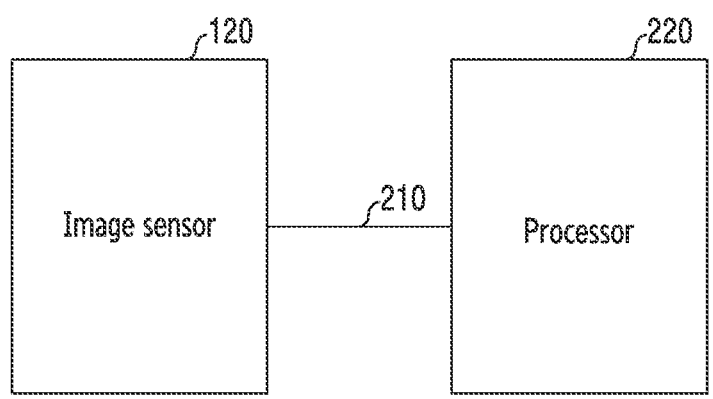
FIG. 2 is a block diagram illustrating a hardware configuration of an electronic device according to an embodiment of the disclosure.

FIG. 2 is a block diagram illustrating a hardware configuration of an electronic device 100 according to an embodiment of the disclosure.

Referring to FIG. 2, in an embodiment, an electronic device 100 may include an image sensor 120, an interface 210, and a processor 220.

According to one embodiment, an image sensor 120 may correspond to a CMOS image sensor or a CCD image sensor. Information of light of the subject incident through a lens assembly 111 may be converted into an electric signal by the image sensor 120 and provided to a processor 220.

According to another embodiment, image data provided to the processor 220 by the image sensor 120 may mean an electric signal output from each unit pixel of the image sensor 120 by light incident through the lens assembly 111. The image data may mean a color value of each unit pixel. The color value may include color information and brightness information. In an example, in case that a color filter array includes red (R), green (G), and blue (B), image data of the unit pixel may include color information of at least one of R, G, and B. The red, green, and blue are merely examples of the color value and the color value is not limited thereto. The color value may correspond to at least one of red, green, blue, yellow, emerald, white, cyan, and magenta. According to some embodiments, the color filter array may include a color filter array having an red, green, blue, emerald (RGBE) pattern, a cyan, yellow, magenta (CYM) pattern, a cyan, yellow, green, magenta (CYGM) pattern, or an RGBW (red, green, blue, white) pattern.

According to yet another embodiment, the image sensor 120 may provide configuration information for image data together with the image data to the processor 220. For example, the configuration information for image data may include information for an output mode of image data. In another example, the output mode of image data may be understood as a preset value with respect to at least one piece of information from among an image size, a frame rate, the number of bits of image data, a frame identity (ID), high dynamic range (HDR) processing or not, binning or not, a conversion gain, gyro information, and exposure time. In still another embodiment, the frame ID may be understood as a flag assigned to each frame for processing efficiency in a multi frame mode of synthesizing multiple images or during a DRAM using operation.

According to an embodiment of the disclosure, the image data output by the image sensor 120 may be included in an image frame. The image frame may be divided into image data and an embedded data area. In another embodiment, the embedded data area may be divided into an embedded header prior to image data and an embedded footer subsequent to the image data. In still another embodiment, the embedded data area may include at least one of a data type field, a data resolution field, a data length field, a changing field, a sensor information field, a destination identity (ID) field, and a time stamp field. The embedded data area may include configuration information (e.g., exposure time, frame information, a temperature, and a voltage) of a corresponding frame, and the configuration information may be used in the processor 220. In still another embodiment, the configuration information may be used for a debugging process.

In one embodiment, the image sensor 120 may provide the image frame to the processor 220 through the interface 210. According to another embodiment, the interface 210 may be understood to include at least one interface. For example, the interface 210 may include at least one of a mobile industry processor interface (MIPI), an inter-integrated circuit (I2C), a master clock (MCLOCK), VSYNC, and a reset signal line. From this point of view, the interface 210 may be referred to as at least one interface or one or more interfaces.

According to yet another embodiment, the interface 210 may include at least one of a data lane for transmitting a data signal (e.g., image data), a clock lane for transmitting a clock signal, and a camera control interface for transmitting a control signal. In an example, the data lane may correspond to an MIPI and the camera control interface may correspond to a I2C. In another embodiment, the interface 210 may correspond to a signal line using a differential signal.

According to one embodiment, the processor 220 may be understood to include at least one processor. For example, the processor 220 may include at least one of an application processor (AP), an image signal processor 130, and a communication processor (CP). From this point of view, the processor 220 may be referred to as at least one processor or one or more processors.

According to another embodiment, the processor 220 may include the image signal processor 130 and the AP, and the image sensor 120 may provide image data and configuration information for the image data to the image signal processor 130. The image signal processor 130 may provide image data provided from the image sensor 120 to the AP. According to yet another embodiment, the processor 220 may mean the AP and the AP may include the image signal processor 130. The image sensor 120 may provide image data and configuration information for the image data to the image signal processor 130 included in the AP. According to still another embodiment, the processor 220 may mean the AP, and the image sensor 120 may directly provide image data and configuration information for the image data to the AP.

According to one embodiment, the processor 220 (e.g., the image signal processor 130) may analyze the image data provided from the image sensor 120 to determine whether control of the image sensor 120 is necessary. In case of determining that control of the image sensor 120 is necessary, the processor 220 may output a signal for controlling the image sensor 120. According to another embodiment, the processor 220 may provide a signal for controlling the image sensor 120 to the image sensor 120 through the interface 210. In case of determining that an output mode of the image sensor 120 needs to be changed, for example, the processor 220 may provide a control signal for changing the output mode to the image sensor 120 through the interface 210.

Figure 3:
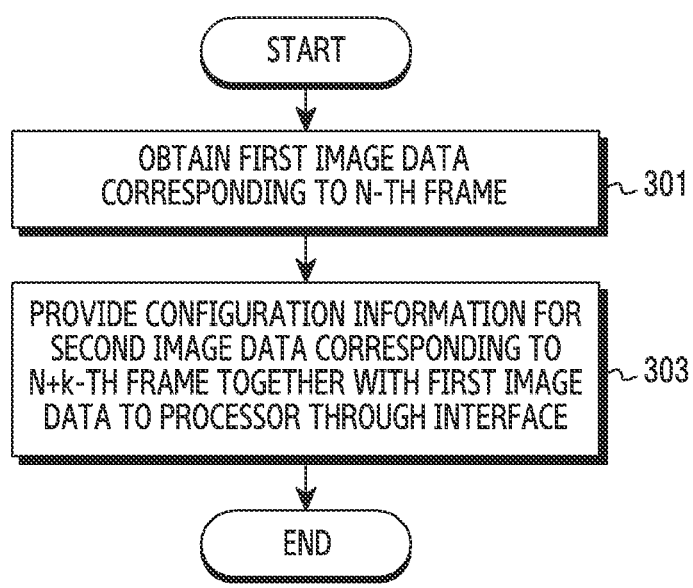
FIG. 3 is a flowchart illustrating an operation of an image sensor according to an embodiment of the disclosure.

FIG. 3 is a flowchart illustrating an operation of an image sensor 120 according to an embodiment of the disclosure.

The operation described in FIG. 3 may be performed by the image sensor 120 shown in FIGS. 1 and 2.

According to an embodiment of the disclosure, in operation 301, the image sensor 120 may obtain first image data corresponding to a N-th frame. N may correspond to a natural number.

According to another embodiment, in operation 303, the image sensor 120 may provide second image data corresponding to a N+k-th frame provided subsequent to the N-th frame together with the first image data obtained in operation 301 to the processor 220 through the interface 210. N and k may correspond to natural numbers. For example, k may correspond to 1 or 2.

According to yet another embodiment, the image sensor 120 may provide configuration information for the second image data corresponding to the N+k-th frame together with the first image data corresponding to the N-th frame to the processor 220 in advance. The processor 220 may obtain information for the N+k-th frame in advance through the configuration information for the second image data while processing the first image data corresponding to the N-th frame. The processor 220, for example, may obtain information indicating that an output mode is changed in the N+k-th frame in advance through the configuration information for the second image data and prepare to process the second image data. In another example, the processor 220 may obtain information indicating that frame per second (fps) is changed in the N+k-th frame in advance through the configuration information for the second image data and prepare to process the second image data.

According to still another embodiment, the configuration information for the first image data may be referred to first configuration information and the configuration information for the second image data may be referred to second configuration information. The image sensor 120 may provide the second configuration information together with the first image data to the processor 220. According to one embodiment, the image sensor 120 may provide the first configuration information together with the first image data and the second configuration information to the processor 220.

According to another embodiment, configuration information for image data may include at least one of an image data output mode, an image size, a frame rate, the number of bits of image data, a frame identity (ID), HDR processing or not, binning or not, a conversion gain, gyro information, and exposure time. Only a case in which an output mode is changed will be described, but this is merely for convenience of explanation, and the disclosure is not limited to the output mode change.

According to still another embodiment, the image sensor 120 may add configuration information for image data to all frames and provide same to the processor 220. The image sensor 120 may record the configuration information for the image data in the same format (e.g., RAW10) as the image data or in a different data type (DT) from the image data and provide same to the processor 220. In an embodiment, the image sensor 120 may provide the configuration information for the image data to the processor 220 through the same interface 210 as the image data or provide the configuration information for the image data to the processor 220 through a separate interface 210 from the image data.

Figure 4:
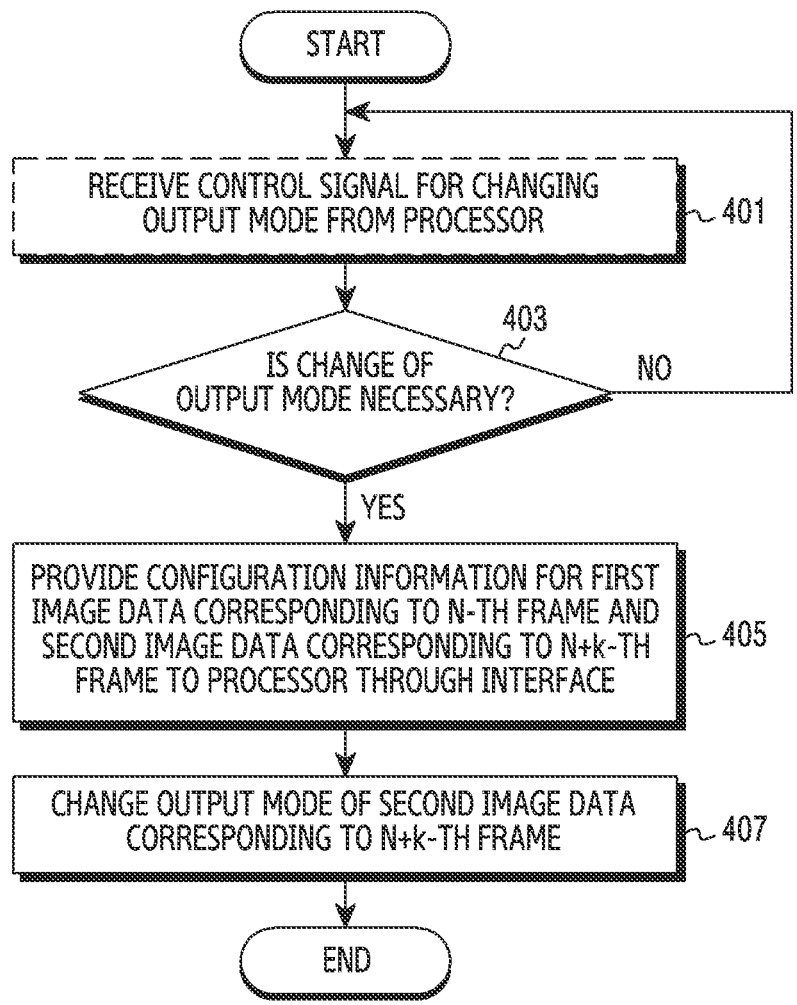
FIG. 4 is a flowchart illustrating an operation of changing an output mode by an image sensor according to an embodiment of the disclosure.

FIG. 4 is a flowchart illustrating an operation of changing an output mode by an image sensor 120 according to an embodiment of the disclosure.

The operation described in FIG. 4 may be performed by the image sensor 120 shown in FIGS. 1 and 2.

In operation 401, the image sensor 120 may receive a control signal for changing an output mode from the processor 220.

According to another embodiment, the processor 220 may analyze image data and provide a control signal for changing an output mode to the image sensor 120 when determining that an output mode is required to be changed. The image sensor 120 may receive the control signal provided from the processor 220.

According to yet another embodiment, operation 401 may be omitted. For example, even in case that the image sensor 120 does not receive the control signal of the processor 220, the image sensor 120 may determine by itself that an output mode change is necessary.

According to still another embodiment, in an operation 403, the image sensor 120 may determine whether the output mode change is necessary.

According to one embodiment of the disclosure, in case that the image sensor 120 receives the control signal for changing the output mode from the processor 220, the image sensor 120 may determine whether the output mode change is necessary according to the control signal.

According to another embodiment, even in case of not receiving the control signal of the processor 220, the image sensor 120 may determine by itself that the output mode change is necessary. In an example, the image sensor 120 may detect movement of the subject or the electronic device 100 and change fps through the detected movement. In another example, according to a battery level of the electronic device 100, the image sensor 120 may change the output mode to output a resolution of an image to be output from a first resolution to a second resolution lower than the first resolution. In yet another example, the image sensor 120 may output an image at the second resolution lowered by ¼ by combining (e.g., 2×2 binning) four pixels at the first resolution.

In operation 405, the image sensor 120 may provide configuration information for the first image data corresponding to the N-th frame and the second image data corresponding to the N+k-th frame to the processor 220 through the interface 210.

According to another embodiment, in response to reception of the control signal for changing the output mode from the processor 220, the image sensor 120 may provide the configuration information for the first image data and the second image data to the processor 220. According to yet another embodiment, in case that the image sensor determines by itself that the output mode change is necessary, the image sensor 120 may provide the configuration information for the first image data and the second image data to the processor 220.

According to still another embodiment, the configuration information for the second image data may include information related to the output mode change. For example, the configuration information may include information for the output mode to be changed in the second image data and information indicating the N+k-th frame in which the output mode is changed according to the control signal received from the processor 220. In another example, the configuration information may include information for the output mode that the image sensor 120 determined by itself to change and information indicating the N+k-th frame in which the output mode is changed.

In operation 407, the image sensor 120 may change the output mode of the second image data corresponding to the N+k-th frame. In one embodiment, the image sensor 120 may change the output mode according to the control signal received from the processor 220. In another embodiment, the image sensor 120 may change the output mode according to a result of self-determination.

Figure 5:
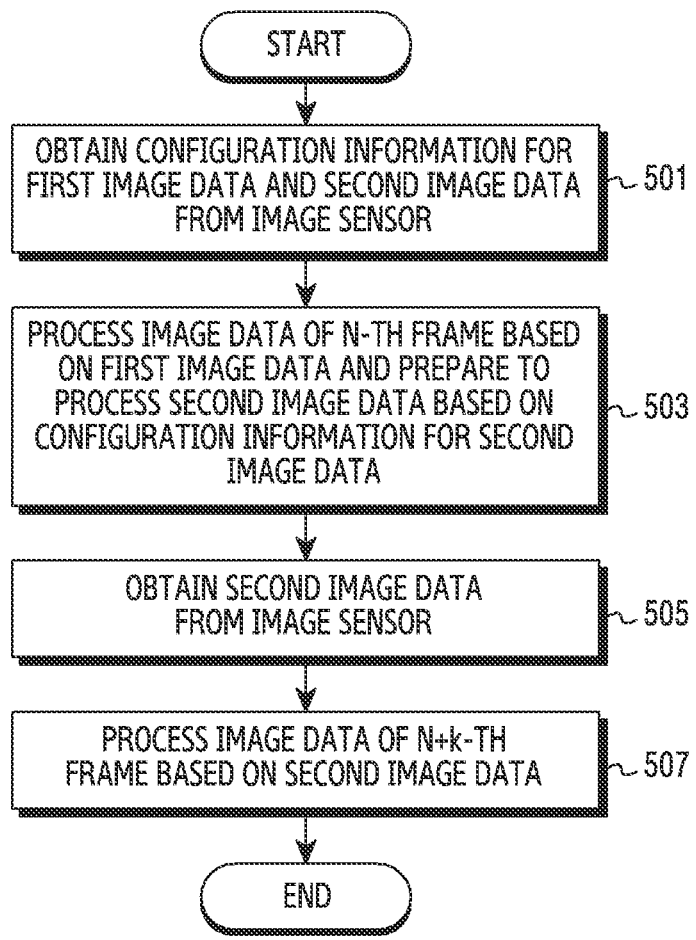
FIG. 5 is a flowchart illustrating an operation of a processor according to an embodiment of the disclosure.

FIG. 5 is a flowchart illustrating an operation of a processor 220 according to an embodiment of the disclosure.

The operation described in FIG. 5 may be performed by the processor 220 shown in FIG. 2.

According to one embodiment, in operation 501, the processor 220 may obtain, from the image sensor 120, the configuration information for the first image data corresponding to the N-th frame and the second image data corresponding to the N+k-th frame.

According to another embodiment, the configuration information for the second image data may include information for the output mode to be changed and information indicating that the output mode is changed in the second image data corresponding to the N+k-th frame.

According to still another embodiment, in operation 503, the processor 220 may process image data of the N-th frame based on the first image data and prepare to process the second image data based on the configuration information for the second image data.

According to yet another embodiment, the processor 220 may obtain information indicating that the output mode is changed in the second image data corresponding to the N+k-th frame in advance based on the configuration information for the second image data and prepare to process the second image data.

In operation 505, the processor 220 may obtain the second image data corresponding to the N+k-th frame from the image sensor 120.

According to an embodiment of the disclosure, in case that the image sensor 120 outputs the second image data in the changed output mode, the processor 220 may change a processing mode of the second image data as prepared through the configured information for the second image data. Since the processor 220 may obtain the information indicating that the output mode of the second image data is changed, in advance through the configuration for the second image data, a frame in which the output mode of the image sensor 120 and a processing mode of the processor 220 are changed may be the same as the N+k-th frame.

According to another embodiment, the change of the processing mode in which the processor 220 processes image data may include at least one of a change of resolution, a change of output bit, a change of HDR processing or not, ON/OFF of AF information, a change of output FPS, a change of white balance, a change of exposure time, a change of conversion gain, and ON/OFF of a function of the image sensor 120 such as flicker detection.

According to yet another embodiment, in operation 507, the processor 220 may process the second image data of the N+k-th frame based on the second image data.

Figure 6:
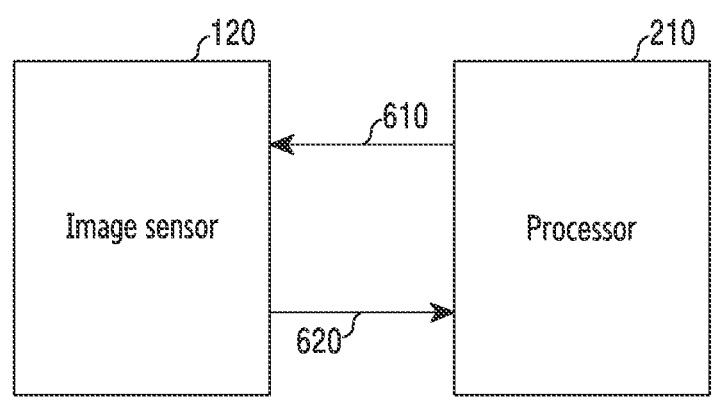
FIG. 6 is a block diagram illustrating a hardware configuration of an electronic device according to an embodiment of the disclosure.

FIG. 6 is a block diagram illustrating a hardware configuration of an electronic device 100 according to an embodiment of the disclosure.

Referring to FIG. 6, a description of contents corresponding to those described with reference to FIG. 2 may be omitted.

According to one embodiment, an interface 210 may include a first interface 610 and a second interface 620. The first interface 610 may correspond to an interface 210 through which a processor 220 outputs a signal for controlling an image sensor 120. The second interface 620 may correspond to an interface 210 through which the image sensor 120 outputs image data and configuration information for the image data to the processor 220.

According to another embodiment, the first interface 610 may correspond to an inter-integrated circuit (I2C), and the second interface 620 may correspond to a mobile industry processor interface (MIPI).

According to yet another embodiment, the first interface 610 may correspond to an interface 210 for supporting unidirectional communication for outputting a signal from the processor 220 to the image sensor 120, and the second interface 620 may correspond to an interface 210 for supporting unidirectional communication for outputting data from the image sensor 120 to the processor 220. According to still another embodiment, at least one of the first interface 610 and the second interface 620 may correspond to an interface 210 for supporting bidirectional communication between the image sensor 120 and the processor 220.

The image sensor 120 may provide configuration information for image data to the processor 220 through the second interface 620 that is the same interface 210 as that for the image data. In an embodiment, the image sensor 120 may record the configuration information for the second image data in an embedded data area of a first image frame including the first image data. The image sensor 120 may record the configuration information for the second image data in an embedded header area preceding the first image data within the first image frame or in an embedded footer area subsequent to the first image data. According to another embodiment, the image sensor 120 may record the configuration information for the second image data in a separate area other than the embedded data area of the first image frame including the first image data. The image sensor 120 may provide the first image frame including the configuration information for the first image data and the second image data to the processor 220 through the second interface 620.

According to yet another embodiment, the first image frame may further include the configuration information for the first image data in addition to the configuration information for the first image data and the second image data. For example, the configuration information for the first image data and the configuration information for the second image data may be recorded in the embedded data area of the first image frame.

Figure 7:
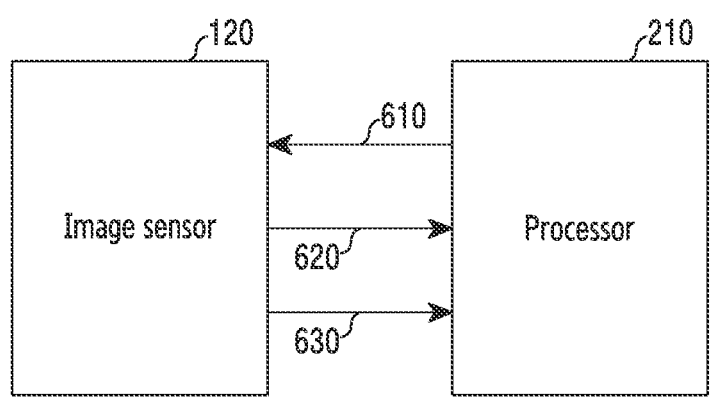
FIG. 7 is a block diagram illustrating a hardware configuration of an electronic device according to an embodiment of the disclosure.

FIG. 7 is a block diagram illustrating a hardware configuration of an electronic device 100 according to an embodiment of the disclosure.

Referring to FIG. 7, a description of contents corresponding to those described with reference to FIG. 2 or FIG. 6 may be omitted.

According to an embodiment, an interface 210 may further include a third interface 630. An image sensor 120 may provide image data to a processor 220 through a second interface 620 and provide configuration information for the image data to the processor 220 through the third interface 630. The image sensor 120 may provide configuration information for image data to the processor 220 through the third interface 630 that is a separate interface 210 from that for the image data.

According to another embodiment, the image sensor 120 may record the configuration information for the second image data in a separate packet or data format other than the first image frame. The image sensor 120 may provide the first image frame corresponding to the first image data to the processor 220 through the second interface 620 and provide the configuration information for the second image data recorded in a separate packet or data format in a separate data type different from the first image frame to the processor 220 through the third interface 630.

According to yet another embodiment, the third interface 630 may correspond to an interface 210 for supporting unidirectional communication for outputting data to the processor 220 from the image sensor 120. According to still another embodiment, the third interface 630 may correspond to an interface 210 for supporting bidirectional communication between the image sensor 120 and the processor 220.

The image sensor 120 may record the configuration information for the first image data in an embedded area of the first image frame including the first image data. The image sensor 120, for example, may provide the first image data and the configuration information for the first image data to the processor 220 through the second interface 620 and provide the configuration information for the second image data to the processor 220 through the third interface 630. In still another embodiment, the image sensor 120 may provide the first image data to the processor 220 through the second interface 620 and provide the first image data and the configuration information for the first image data to the processor 220 through the third interface 630.

Figure 8:
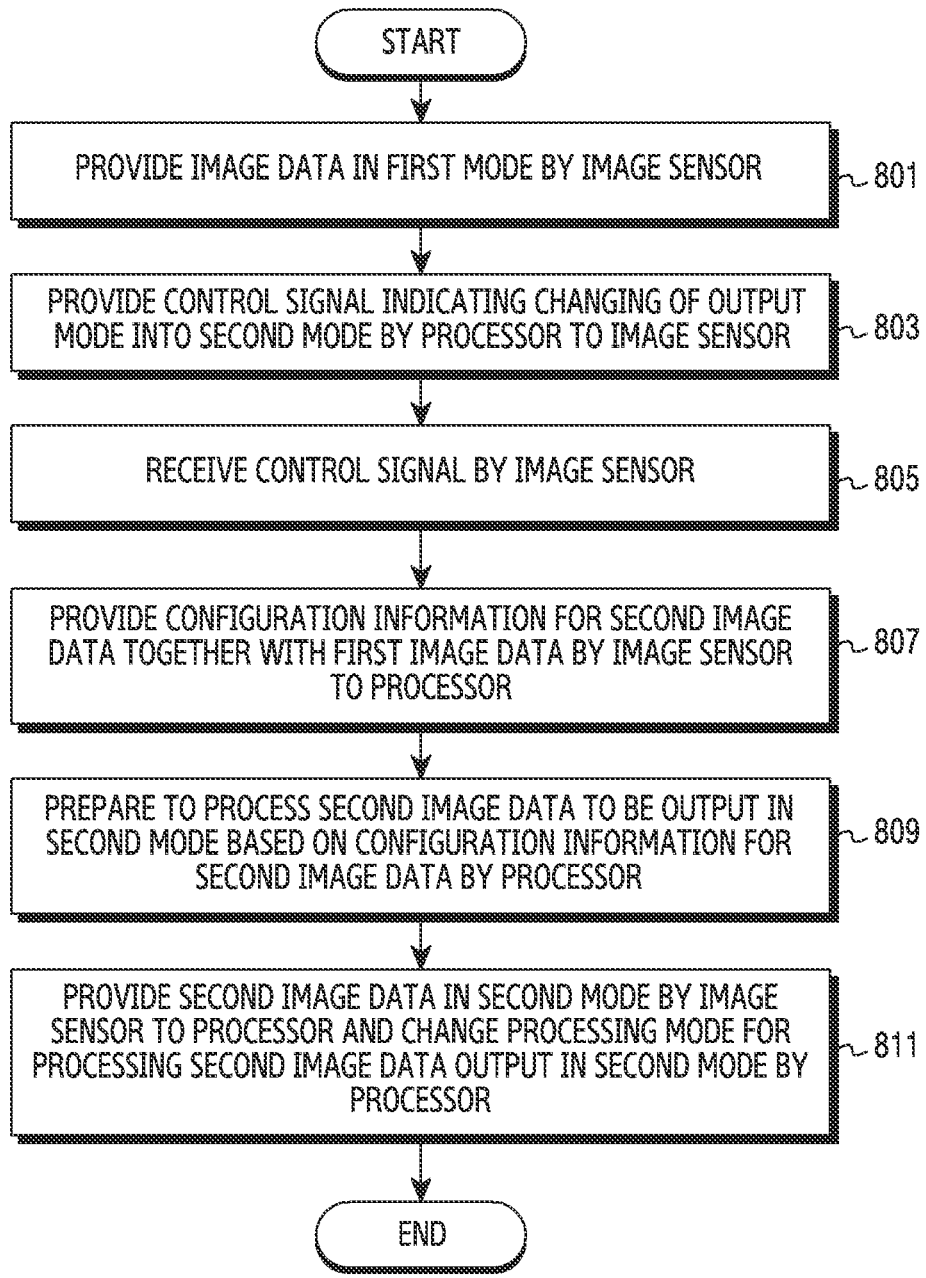
FIG. 8 is a flowchart illustrating an example of operating of an image sensor and a processor according to an embodiment of the disclosure.

FIG. 8 is a flowchart illustrating an example of operating of an image sensor 120 and a processor 220 according to an embodiment of the disclosure.

The operation described in FIG. 8 may be performed by the image sensor 120 and the processor 220 shown in FIG. 2.

Referring to FIG. 8, according to an embodiment, in operation 801, the image sensor 120 may provide image data in a first mode to the processor 220. In an embodiment, the processor 220 may display a corresponding frame on a display 110 based on image data received from the image sensor 120 or determine whether an output mode of image data needs to be changed.

In operation 803, the processor 220 may provide, to the image sensor 120, a control signal indicating changing of an output mode from a first mode to a second mode.

According to another embodiment, the processor 220 may provide a control signal indicating changing of an output mode to the image sensor 120 through the interface 210 (e.g., the first interface 610).

According to yet another embodiment, in operation 805, the image sensor 120 may receive a control signal provided by the processor 220. In case that a control signal provided to the image sensor 120 from the processor 220 exists in a valid state, the image sensor 120 may receive the control signal.

According to still another embodiment, the image sensor 120 may be in a valid state or a blank state at a time point at which the processor 220 provides a control signal and thus there may be a difference between a frame in which the processor 220 provides the control signal and a frame in which the image sensor 120 receives the control signal. A detailed description will be given with reference to FIG. 9 below.

According to one embodiment oof the disclosure, in operation 807, the image sensor 120 may provide the configuration information for the second image data together with the first image data to the processor 220.

According to another embodiment, the image sensor 120 may provide the configuration information for the first image data and the second image data to the processor 220 through the same interface 210 (e.g., the second interface 620). According to still another embodiment, the image sensor 120 may provide the configuration information for the first image data and the second image data to the processor 220 through separate interfaces 210 (e.g., the first image data through the second interface 620 and the second image data through the third interface 630).

In an embodiment, the image sensor 120 may provide the configuration information for the first image data together with the first image data and the configuration information for the second image data to the processor 220. In another embodiment, the image sensor 120 may provide the configuration information for the first image data to the processor 220 through the second interface 620 or the third interface 630.

According to yet another embodiment, the configuration information for the second image data may include information (e.g., information indicating changing of an output mode to the second mode) with respect to the control signal provided by the processor 220 and information (e.g., information indicating outputting of the second image data in the second mode) indicating that a control operation is performed in the second image data.

In operation 809, the processor 220 may prepare to process the second image data to be output in the second mode based on the configuration information for the second image data.

According to another embodiment, in operation 811, the image sensor 120 may provide the second image data in the second mode to the processor 220 and the processor 220 may change a processing mode for processing the second image data output in the second mode. The processor 220 may process the second image data in a changed mode.

Figure 9:
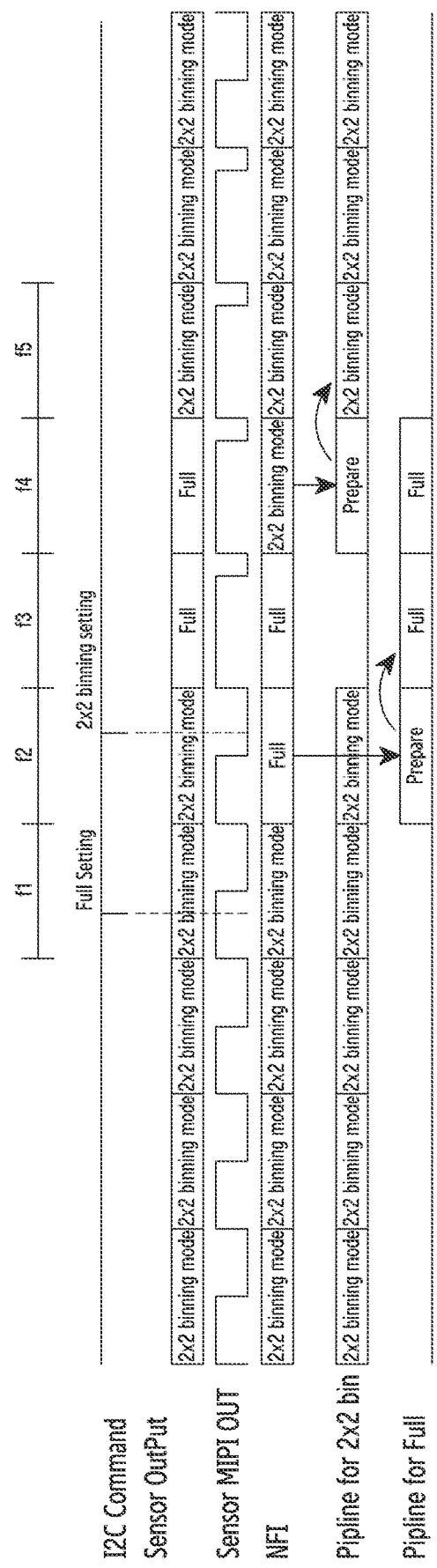
FIG. 9 illustrates an example of operating of an image sensor and a processor according to an embodiment of the disclosure.

FIG. 9 is a flowchart illustrating an example of operating of an image sensor 120 and a processor 220 according to an embodiment of the disclosure.

Referring to FIG. 9, image data provided by the image sensor 120 to the processor 220 in a section of f1 frame to f5 frame may be referred to as first image data to fifth image data. In FIG. 9, k may be understood as 1.

According to one embodiment, the image sensor 120 may provide image data in a binning mode to the processor 220. With respect to the description with reference to FIG. 8, the first mode may be understood as the binning mode.

According to another embodiment, in a f1 frame section, the processor 220 may provide, to the image sensor 120, a control signal indicating changing of an output mode to a full mode. With respect to the description with reference to FIG. 8, the second mode may be understood as the full mode. In yet another embodiment, the processor 220 may analyze the image data provided in the binning mode, determine that an output mode needs to be changed into the full mode, and provide a control signal to the image sensor 120.

According to still another embodiment, in case that in the f1 frame section, the image sensor 120 is in the valid state at a time point in which the processor 220 provides a control signal to the sensor 120, the image sensor 120 may receive the control signal in the f1 frame section. The image sensor 120 may determine that the output mode needs to be changed according to the control signal provided from the processor 220.

The image sensor 120 may provide, to the processor 220, configuration information for the second image data corresponding to a N+1-th frame to be obtained during the f3 frame section together with the second image data corresponding to a N-th frame obtained during the f2 frame section. In an embodiment, the image sensor 120 may provide the second image data corresponding to the N-th frame in the binning mode to the processor 220. In another embodiment, the image sensor 120 may add information indicating that an output mode is changed into the full mode in the N+1-th frame to the configuration information for the third image data.

According to still another embodiment, the processor 220 may prepare to process the third image data corresponding to the N+1-th frame based on the configuration information for the third image data provided from the image sensor 120 during the f2 frame section. The processor 220 may prepare to process the third image data to be output in the full mode by the image sensor 120.

According to yet another embodiment, the image sensor 120 may provide the third image data to the processor 220 in the full mode during the f3 frame section and the processor 220 may change the processing mode for processing the third image data output in the full mode. Since the processor 220 has prepared to change the processing mode through the configuration information for the third image data corresponding to the N+1-th frame in advance during the f2 frame section, the processing mode may be seamlessly changed in the f3 frame section.

The processor 220 may provide, to the image sensor 120, a control signal indicating changing of the output mode to the binning mode again in the f2 frame section. With respect to the description with reference to FIG. 8, the second mode may be understood as the binning mode. After outputting the control signal indicating changing of the output mode into the full mode in the f1 frame section, the processor 220, for example, may analyze the first image data, determine that the output mode needs to be changed to the binning mode again, and provide a control signal to the image sensor 120.

According to one embodiment, in case that in the f2 frame section, the image sensor 120 is in the blank state at a time point in which the processor 220 provides a control signal to the sensor 120, the image sensor 120 may receive the control signal in the f3 frame section. The image sensor 120 may determine that the output mode needs to be changed according to the control signal provided from the processor 220.

According to another embodiment, the image sensor 120 may provide, to the processor 220, configuration information for fifth image data corresponding to a M+1-th frame to be obtained during a f5 frame section together with fourth image data corresponding to a M-th frame obtained during a f4 frame section. For example, the image sensor 120 may provide the fourth image data corresponding to the M-th frame in the full mode to the processor 220. The image sensor 120 may add information indicating that an output mode is changed into the binning mode again in the M+1-th frame to the configuration information for the fifth image data.

According to another embodiment, the processor 220 may prepare to process the fifth image data corresponding to the M+1-th frame based on the configuration information for the fifth image data provided from the image sensor 120 during the f4 frame section. The processor 220 may prepare to process the fifth image data to be output in the binning mode by the image sensor 120.

According to yet another embodiment, the image sensor 120 may provide the fifth image data to the processor 220 in the binning mode during the f5 frame section and the processor 220 may change the processing mode for processing the fifth image data output in the binning mode. Since the processor 220 has prepared to change the processing mode through the configuration information for the fifth image data corresponding to the M+1-th frame during the f4 frame section, the processing mode may be seamlessly changed in the f5 frame section.

Since the image sensor 120 provides, to the processor 220, configuration information for image data corresponding to the N+1-th frame together with image data corresponding to the N-th frame, the processor 220 may obtain information indicating changing of the output mode in the N+1-th frame in advance and prepare to change the processing mode. In case that configuration information for image data corresponding to the N+1-th frame is not provided, the processor 220, for example, may prepare to change the processing mode after receiving configuration information for image data corresponding to the N+1-th frame provided together with the image data corresponding to the N+1-th frame, thus causing delay of processing of the image data. Alternatively, the processor 220 may provide a control signal indicating changing to the binning mode in the f2 frame section to the image sensor 120, prepare right away to perform changing to the binning mode in the f3 frame section, and change the processing mode to process the fourth image data provided in the binning mode in the f4 frame section. Since the image sensor 120 receives the control signal in the f3 frame section to change the output mode in the f5 frame section, the image sensor 120 may output the fourth image data in the full mode in the f4 frame section, then the processor 220 may perform changing to the processing mode for processing the fourth image data provided in the binning mode and may not use the fourth image data. Accordingly, a frame drop in which the processor 220 removes the fourth image data may occur.

Figure 10:
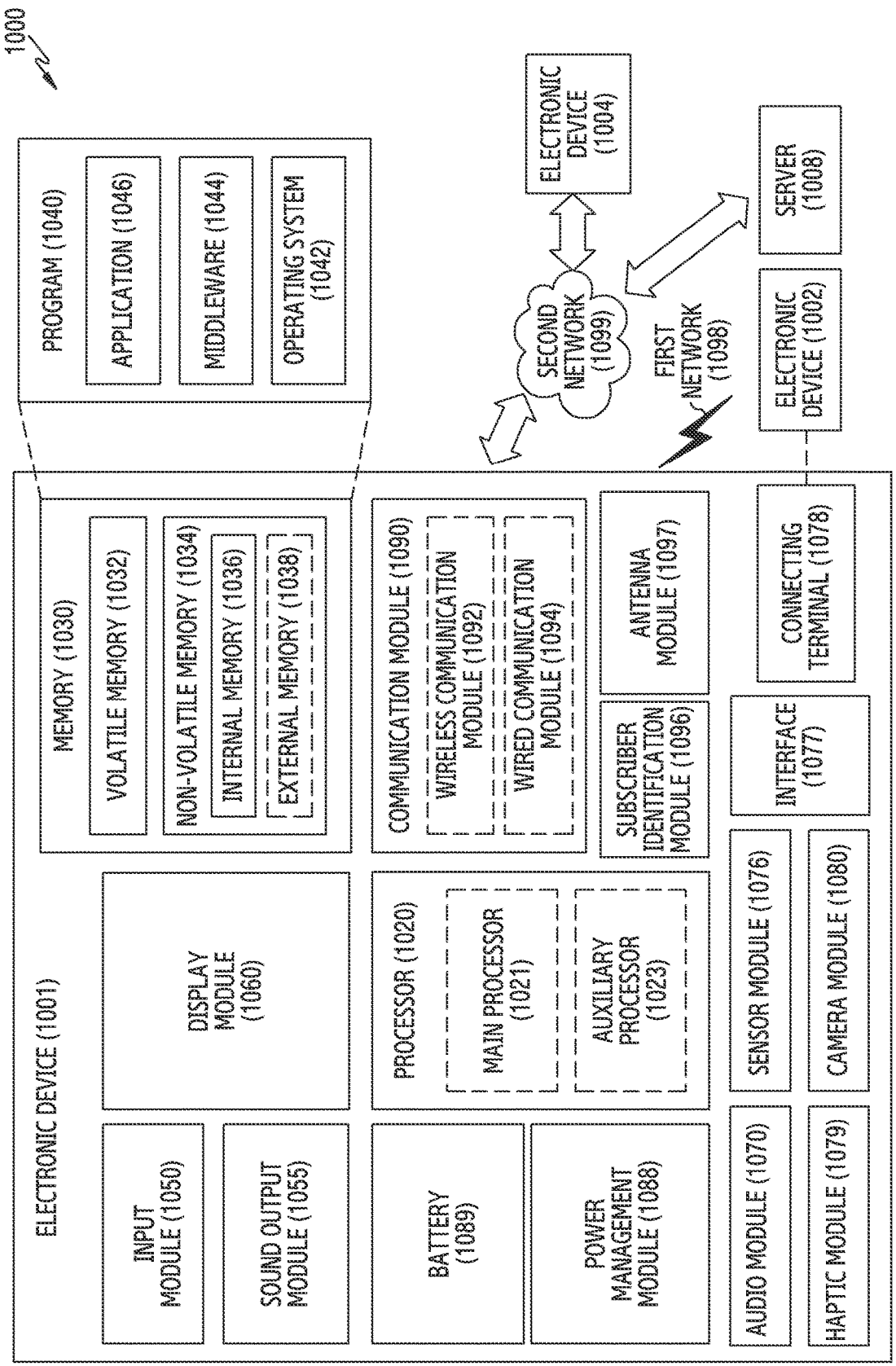
FIG. 10 is a block diagram illustrating an electronic device in a network environment according to an embodiment of the disclosure.

FIG. 10 is a block diagram illustrating an electronic device 1001 in a network environment 1000 according to an embodiment of the disclosure.

Referring to FIG. 10, an electronic device 1001 in a network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to one embodiment, the electronic device 1001 may communicate with the electronic device 1004 via the server 1008. According to another embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may be configured to execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to another embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. In an example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to one embodiment, the auxiliary processor 1023 (e.g., an image signal processor or a communication processor) may be implemented as part of another component (e.g., the camera module 1080 or the communication module 1090) functionally related to the auxiliary processor 1023. According to another embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, reinforcement learning, and the like. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may be configured to store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. In an embodiment, the input module 1050 may include, for example, a microphone, a mouse, a keyboard, a key (e.g., a button), or a digital pen (e.g., a stylus pen).

The sound output module 1055 may output sound signals to the outside of the electronic device 1001. In another embodiment, the sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to one embodiment, the display module 1060 may include a touch sensor adapted to detect a touch, or a pressure sensor adapted to measure the intensity of force incurred by the touch.

The audio module 1070 may convert a sound into an electrical signal and vice versa. According to one embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. In an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 1077 may support one or more specified protocols to be used for the electronic device 1001 to be coupled with the external electronic device (e.g., the electronic device 1002) directly (e.g., wiredly) or wirelessly. According to one embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). In an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to one embodiment, the camera module 1080 may include one or more lenses, image sensors, image signal processors, or flashes.

The power management module 1088 may manage power supplied to the electronic device 1001. In one embodiment, the power management module 1088 may be implemented as at least part of, for example, a power management integrated circuit (PMIC).

The battery 1089 may supply power to at least one component of the electronic device 1001. According to an embodiment of the disclosure, the battery 1089 may include, for example, a primary cell which is not rechargeable, a secondary cell which is rechargeable, or a fuel cell.

The communication module 1090 may be configured to support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. In another embodiment, the wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to yet another embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to one embodiment, the antenna module 1097 may include an antenna including a radiating element composed of a conductive material or a conductive pattern formed in or on a substrate (e.g., a printed circuit board (PCB)). According to another embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to yet another embodiment, another component (e.g., a radio frequency integrated circuit (RFIC)) other than the radiating element may be additionally formed as part of the antenna module 1097.

According to some embodiments, the antenna module 1097 may form a mmWave antenna module. In an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to another embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. In another embodiment, the electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to one embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. In example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). In example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to some embodiments of the disclosure, operations performed by the module, the program, or another component may be carried out sequentially, in parallel, repeatedly, or heuristically, or one or more of the operations may be executed in a different order or omitted, or one or more other operations may be added.

Figure 11:
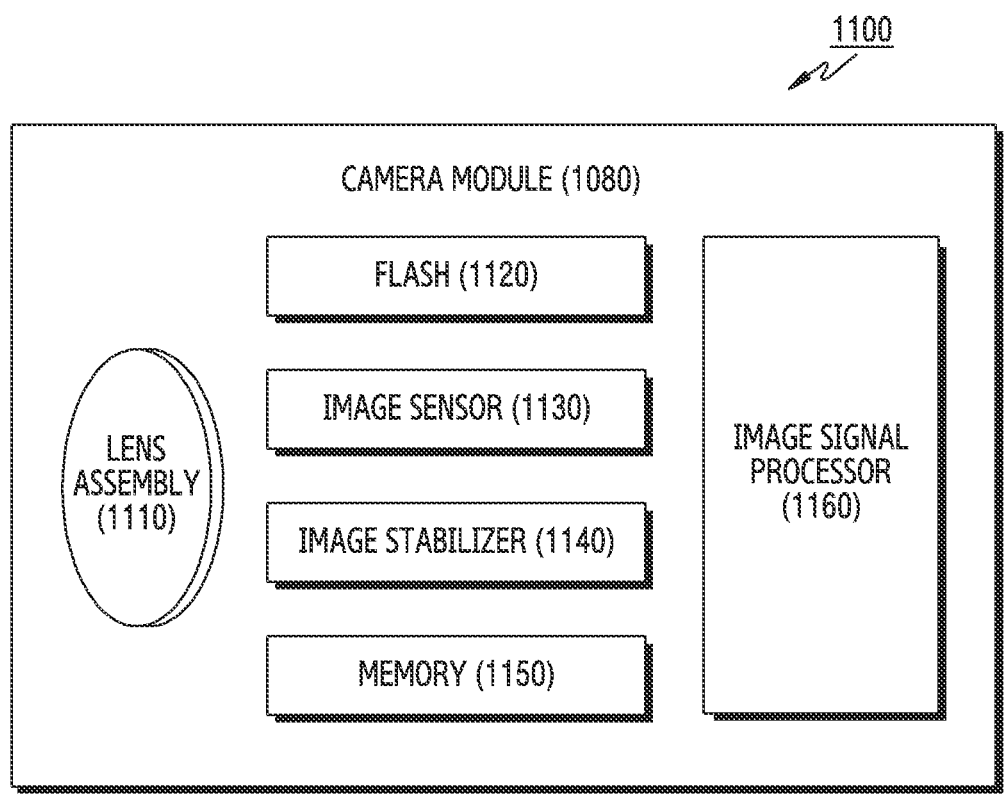
FIG. 11 is a block diagram illustrating a camera module according to an embodiment of the disclosure.

FIG. 11 is a block diagram 1100 illustrating the camera module 1080 according to an embodiment of the disclosure.

Referring to FIG. 11, a camera module 1080 may include a lens assembly 1110, a flash 1120, an image sensor 1130, an image stabilizer 1140, a memory 1150 (e.g., a buffer memory), or an image signal processor 1160. In an embodiment, the lens assembly 1110 may collect light emitted or reflected from an object whose image is to be taken. The lens assembly 1110 may include one or more lenses. In another embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to another embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to still another embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

In an embodiment, the image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to another embodiment, the image stabilizer 1140 may sense such a movement by the camera module 1080 or the electronic device 1001 using a gyro sensor (not shown) or an acceleration sensor (not shown) disposed inside or outside the camera module 1080. According to still another embodiment, the image stabilizer 1140 may be implemented, for example, as an optical image stabilizer The memory 1150 may store, at least temporarily, at least part of an image obtained via the image sensor 1130 for a subsequent image processing task. In an example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display module 1060. Thereafter, if a specified condition is met (e.g., by a user's input or system command), at least part of the raw image stored in the memory 1150 may be obtained and processed, for example, by the image signal processor 1160. According to yet another embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. In an embodiment, an image processed by the image signal processor 1160 may be stored back in the memory 1150 for further processing, or may be provided to an external component (e.g., the memory 1030, the display module 1060, the electronic device 1002, the electronic device 1004, or the server 1008) outside the camera module 1080. According to another embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display module 1060 as it is or after being further processed.

According to yet another embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

In an embodiment of the disclosure, an electronic device may include an image sensor and at least one processor connected through at least one interface to the image sensor. The image sensor, for example, may obtain first image data corresponding to an N-th frame, and provide, together with the first image data obtained, to the at least one processor through the at least one interface, configuration information for second image data corresponding to an N+k-th frame which is to be provided subsequent to the N-th frame. N and the k may be natural numbers.

In the electronic device according to an embodiment, the configuration information for the second image data may correspond to second configuration information, and the image sensor may provide first configuration information for the first image data together with the first image data and the second configuration information to the at least one processor through the at least one interface.

In the electronic device according to another embodiment, in response to reception of the control signal for changing an output mode from the at least one processor, the image sensor may change an output mode of the second image data corresponding to the N+k-th frame, and the configuration information for the second image data may include information for the changed output mode.

In the electronic device according to yet another embodiment, the image sensor may determine whether change of an output mode is necessary, and in case of determining that change of the output mode is necessary, change an output mode of the second image data corresponding to the N+k-th frame, and the configuration information for the second image data may include information for the changed output mode.

In the electronic device according to still another embodiment, the at least one processor may process image data of the N-th frame based on the first image data, prepare to process the second image data based on the configuration information for the second image data, and in case that the second image data is provided, process image data of the N+k-th frame based on the second image data.

In the electronic device according to an embodiment, the at least one interface may include a first interface through which the image sensor receives a signal configured to control the image sensor from the at least one processor and a second interface through which the image sensor transmits image data to the at least one processor.

In the electronic device according to another embodiment of the disclosure, the first interface may correspond to an inter-integrated circuit (I2C), and the second interface may correspond to a mobile industry processor interface (MIPI).

In the electronic device according to yet another embodiment of the disclosure, the image sensor may record the configuration information for the second image data in an embedded data area of a first image frame including the first image data, and provide the first image frame to the at least one processor through the second interface.

In the electronic device according to still another embodiment of the disclosure, the at least one interface may further include a third interface, and the image sensor may provide the first image data to the at least one processor through the second interface and provide the configuration information for the second image data to the at least one processor through the third interface.

In the electronic device according to an embodiment, the configuration information for the second image data may include at least one of an image data output mode, an image size, a frame rate, the number of bits of image data, a frame ID, high dynamic range (HDR) processing or not, binning or not, a conversion gain, gyro information, and exposure time.

An operation method of an electronic device according to another embodiment may include an operation of obtaining first image data corresponding to an N-th frame by an image sensor included in the electronic device, and an operation of providing, together with the first image data obtained, by the image sensor to the at least one processor included in the electronic device through the at least one interface, configuration information for second image data corresponding to an N+k-th frame which is to be provided subsequent to the N-th frame.

In the operation method of an electronic device according to yet another embodiment, the configuration information for the second image data may correspond to second configuration information, and first configuration information for the first image data may be provided together in an operation of providing the first image data and the second configuration information to the at least one processor by the image sensor through the at least one interface.

The operation method of an electronic device may include an operation of receiving the control signal for changing an output mode from the at least one processor by the image sensor and in response to reception of the control signal by the image sensor, an operation of changing an output mode of the second image data corresponding to the N+k-th frame, and the configuration information for the second image data may include information for the changed output mode.

The operation method of an electronic device according to another embodiment of the disclosure may include an operation of determining, by the image sensor, whether change of an output mode is necessary, and in case of determining that change of the output mode is necessary, an operation of changing an output mode of the second image data corresponding to the N+k-th frame, and the configuration information for the second image data may include information for the changed output mode.

The operation method of an electronic device according to yet another embodiment of the disclosure may include an operation of processing, by the at least one processor, image data of the N-th frame based on the first image data, an operation of preparing, by the at least one processor, to process the second image data based on the configuration information for the second image data, and in case that the second image data is provided, an operation of processing, by the at least one processor, image data of the N+k-th frame based on the second image data.

An electronic device according to still another embodiment may include an image sensor and at least one processor connected through at least one interface to the image sensor. The at least one processor may provide a control signal for changing an output mode of the image sensor to the image sensor, obtain, from the image sensor through the at least one interface, configuration information for first image data corresponding to a N-th frame and second image data corresponding to a N+k-th frame to be provided subsequent to the N-th frame, and prepare processing of the second image data corresponding to the N+K-th frame through the configuration information for the second image data. N and the k may be natural numbers.

In the electronic device according to an embodiment, in response to reception of the control signal, the image sensor may change an output mode of second image data corresponding to the N+k-th frame, and the configuration information for the second image data may include information for the changed output mode.

In the electronic device according to another embodiment, the at least one interface may include a first interface through which the at least one processor transmits a signal configured to control the image sensor and a second interface through which the at least one processor receives imaged data from the image sensor.

In the electronic device according to yet another embodiment, the at least one processor may obtain the first image data and the configuration information for the second image data including information for the control signal from the image sensor through the second interface.

In the electronic device according to still another embodiment, the at least one processor may obtain the second image data provided in the changed output mode according to the control signal from the image sensor through the second interface.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   an image sensor; and
   at least one processor connected to the image sensor through at least one interface,
   wherein the image sensor is configured to:
      obtain first image data corresponding to an N-th frame, and
      provide, together with the first image data obtained, to the at least one processor through the at least one interface, configuration information for second image data corresponding to an N+k-th frame to be provided subsequent to the N-th frame, and
   wherein N and k correspond to natural numbers.

2. The electronic device of claim 1,
   wherein the configuration information for the second image data corresponds to second configuration information, and
   wherein the image sensor provides first configuration information for the first image data together with the first image data and the second configuration information to the at least one processor through the at least one interface.

3. The electronic device of claim 1,
   wherein, in response to reception of a control signal for changing an output mode from the at least one processor, the image sensor changes an output mode of the second image data corresponding to the N+k-th frame, and
   wherein the configuration information for the second image data comprises information for the output mode to be changed.

4. The electronic device of claim 1,
   wherein the image sensor is further configured to:
      determine whether change of an output mode is necessary; and
      in case of determining that change of the output mode is necessary, change an output mode of the second image data corresponding to the N+k-th frame, and
   wherein the configuration information for the second image data comprises information for the output mode to be changed.

5. The electronic device of claim 1, wherein the at least one processor is further configured to:
   process image data of the N-th frame based on the first image data;

prepare to process the second image data based on the configuration information for the second image data; and in case that the second image data is provided, process image data of the N+k-th frame based on the second image data.

6. The electronic device of claim 1, wherein the at least one interface comprises:
a first interface through which the image sensor receives a signal configured to control the image sensor from the at least one processor; and
a second interface through which the image sensor transmits image data to the at least one processor.

7. The electronic device of claim 6,
wherein the first interface corresponds to an inter-integrated circuit (I2C), and
wherein the second interface corresponds to a mobile industry processor interface (MIPI).

8. The electronic device of claim 6, wherein the image sensor is further configured to:
record the configuration information for the second image data in an embedded data area of a first image frame including the first image data; and
provide the first image frame to the at least one processor through the second interface.

9. The electronic device of claim 6,
wherein the at least one interface further comprises a third interface, and
wherein the image sensor is further configured to:
provide the first image data to the at least one processor through the second interface; and
provide the configuration information for the second image data to the at least one processor through the third interface.

10. The electronic device of claim 1, wherein the configuration information for the second image data comprises at least one of an image data output mode, an image size, a frame rate, the number of bits of image data, a frame identity (ID), high dynamic range (HDR) processing or not, binning or not, a conversion gain, gyro information, and exposure time.

11. An operation method of an electronic device, the method comprising:
obtaining first image data corresponding to an N-th frame by an image sensor included in the electronic device; and
providing, together with the first image data obtained, by the image sensor to at least one processor included in the electronic device through at least one interface, configuration information for second image data corresponding to an N+k-th frame provided subsequent to the N-th frame.

12. The operation method of claim 11,
wherein the configuration information for the second image data corresponds to second configuration information, and
wherein the providing of the first image data and the second configuration information by the image sensor to the at least one processor through the at least one interface comprises providing first configuration information for the first image data together.

13. The operation method of claim 11, further comprising:
receiving a control signal for changing an output mode from the at least one processor by the image sensor; and in response to reception of the control signal by the image sensor, changing an output mode of the second image data corresponding to the N+k-th frame,
wherein the configuration information for the second image data comprises information for the output mode to be changed.

14. The operation method of claim 11, further comprising:
determining, by the image sensor, whether change of an output mode is necessary; and
in case of determining that change of the output mode is necessary, changing an output mode of the second image data corresponding to the N+k-th frame,
wherein the configuration information for the second image data comprises information for the output mode to be changed.

15. The operation method of claim 11, further comprising:
processing, by the at least one processor, image data of the N-th frame based on the first image data;
preparing, by the at least one processor, to process the second image data based on the configuration information for the second image data; and
in case that the second image data is provided, processing, by the at least one processor, image data of the N+k-th frame based on the second image data.

16. An electronic device comprising:
an image sensor; and
at least one processor, connected through at least one interface to the image sensor, configured to:
provide a control signal for changing an output mode of the image sensor to the image sensor,
obtain, from the image sensor through the at least one interface, configuration information for first image data corresponding to a N-th frame and second image data corresponding to a N+k-th frame to be provided subsequent to the N-th frame, and
prepare processing of the second image data corresponding to the N+K-th frame through the configuration information for the second image data, N and the k may be natural numbers.

17. The electronic device of claim 16, wherein, in response to reception of the control signal, the image sensor may change an output mode of second image data corresponding to the N+k-th frame, and the configuration information for the second image data may include information for the changed output mode.

18. The electronic device of claim 16, wherein the at least one interface comprises:
a first interface through which the at least one processor transmits a signal configured to control the image sensor, and
a second interface through which the at least one processor receives imaged data from the image sensor.

19. The electronic device of claim 18, wherein the at least one processor is further configured to:
obtain the first image data and the configuration information for the second image data including information for the control signal from the image sensor through the second interface.

20. The electronic device of claim 18, wherein the at least one processor is further configured to:
obtain the second image data provided in the changed output mode according to the control signal from the image sensor through the second interface.

* * * * *